United States Patent
Li et al.

(10) Patent No.: US 7,948,944 B2
(45) Date of Patent: May 24, 2011

(54) METHOD AND SYSTEM FOR MULTI-CARRIER PACKET COMMUNICATION WITH REDUCED OVERHEAD

(75) Inventors: Xiaodong Li, Kirkland, WA (US); Haiming Huang, Bellevue, WA (US); Titus Lo, Bellevue, WA (US); Ruifeng Wang, Sammamish, WA (US)

(73) Assignee: Neocific, Inc., Bellevue, WA (US)

( * ) Notice: Subject to any disclaimer, the term of this patent is extended or adjusted under 35 U.S.C. 154(b) by 371 days.

(21) Appl. No.: 11/908,257

(22) PCT Filed: Sep. 28, 2006

(86) PCT No.: PCT/US2006/038149
§ 371 (c)(1),
(2), (4) Date: Jul. 14, 2008

(87) PCT Pub. No.: WO2007/038750
PCT Pub. Date: Apr. 5, 2007

(65) Prior Publication Data
US 2009/0232084 A1   Sep. 17, 2009

Related U.S. Application Data

(60) Provisional application No. 60/721,451, filed on Sep. 28, 2005.

(51) Int. Cl.
*H04W 4/00* (2009.01)
(52) U.S. Cl. ...................................... 370/330
(58) Field of Classification Search .......... 370/260, 370/390, 330; 348/14.09, E7.082, E7.084; 709/204
See application file for complete search history.

(56) References Cited

U.S. PATENT DOCUMENTS

| | | | |
|---|---|---|---|
| 6,219,341 B1 | 4/2001 | Varanasi | |
| 6,314,081 B1 | 11/2001 | Chennakeshu et al. | |
| 6,377,783 B1 | 4/2002 | Lo et al. | |
| 6,442,222 B1 | 8/2002 | Ghazi-Moghadam et al. | |
| 6,445,308 B1 * | 9/2002 | Koike | 340/902 |
| 6,459,740 B1 | 10/2002 | Lo | |
| 6,490,270 B1 | 12/2002 | Krishnamoorthy et al. | |
| 6,826,409 B2 * | 11/2004 | Kostic et al. | 455/501 |

(Continued)

OTHER PUBLICATIONS

International Search Report and Written Opinion, International Patent Application No. PCT/US06/38149; Filed Sep. 28, 2006; Applicant Neocific, Inc.; Mailed Feb. 21, 2007; 8 pages.

*Primary Examiner* — Ricky Ngo
*Assistant Examiner* — Chandrahas Patel
(74) *Attorney, Agent, or Firm* — Perkins Coie LLP

(57) ABSTRACT

A method and system for minimizing the control overhead in a multi-carrier wireless communication network that utilizes a time-frequency resource is disclosed. In some embodiments, one or more zones in the time-frequency resource are designated for particular applications, such as a zone dedicated for voice-over-IP (VoIP) applications. By grouping applications of a similar type together within a zone, a reduction in the number of bits necessary for mapping a packet stream to a portion of the time-frequency resource can be achieved. In some embodiments, modular coding schemes associated with the packet streams may be selected that further reduce the amount of necessary control information. In some embodiments, packets may be classified for transmission in accordance with application type, QoS parameters, and other properties. In some embodiments, improved control messages may be constructed to facilitate the control process and minimize associated overhead.

32 Claims, 12 Drawing Sheets

U.S. PATENT DOCUMENTS

| | | |
|---|---|---|
| 6,940,827 B2 | 9/2005 | Li et al. |
| 6,940,914 B1 | 9/2005 | Lo et al. |
| 6,947,748 B2 | 9/2005 | Li et al. |
| 7,020,072 B1 | 3/2006 | Li et al. |
| 7,164,669 B2 | 1/2007 | Li et al. |
| 7,181,246 B2 | 2/2007 | Lo |
| 7,221,680 B2 * | 5/2007 | Vijayan et al. ............... 370/441 |
| 7,619,995 B1 * | 11/2009 | El-Hennawey et al. ...... 370/260 |

* cited by examiner

METHOD AND SYSTEM FOR MULTI-CARRIER PACKET COMMUNICATION WITH REDUCED OVERHEAD

CROSS-REFERENCE TO RELATED APPLICATION(S)

This application claims the benefit of U.S. Provisional Patent Application No. 60/721,451, filed on Sep. 28, 2005.

TECHNICAL FIELD

The disclosed technology relates, in general, to wireless communication and, in particular, to multi-carrier packet communication networks.

BACKGROUND

Bandwidth efficiency is one of the most important system performance factors for wireless communication systems. In packet based data communication, where the traffic has a bursty and irregular pattern, application payloads are typically of different sizes and with different quality of service (QoS) requirements. In order to accommodate different applications, a wireless communication system should be able to provide a high degree of flexibility. However, in order to support such flexibility, additional overhead is usually required. For example, in a wireless system based on the IEEE 802.16 standard ("WiMAX"), multiple packet streams are established for each mobile station to support different applications. At the medium access control (MAC) layer, each packet stream is mapped into a wireless connection. The MAC scheduler allocates wireless airlink resources to these connections. Special scheduling messages, DL-MAP and UL-MAP, are utilized to broadcast the scheduling decisions to the mobile stations.

In the MAP scheduling message defined by IEEE802.16, there is significant control overhead. For example, each connection is identified by a 16 bits connection ID (CID). The CID is included in the MAP message to identify the mobile station. The maximum number of connections that a system can support is therefore 65,536. Each mobile station has at least two management connections for control and management messages and a various number of traffic connections for application data traffic. As another example, each connection includes the identification of an airlink resource that can correspond to any time/frequency region that is allocated for communication. The resource allocation is identified in the time domain scale with a start symbol offset (8 bits) and a symbol length (7 bits) and in the frequency domain scale with a start logical subchannel offset (6 bits) and a number of allocated subchannels (6 bits). Due to the fact that different applications have different resource requirements, the allocated resource region is irregular from connection to connection. As a still further example, the modulation and coding scheme for each connection is identified by a 4-bit MCS code, identified as either a downlink interval usage code (DIUC) or an uplink interval usage code (UIUC). Another 2 bits are used to indicate the coding repetition in addition to 3 bits for power control. Overall, the overhead of a MAP message is 52 bits. For applications such as voice-over-IP (VoIP), the payload of an 8 Kbps voice codec is 20 bytes in every 20 ms. The overhead of the MAP message alone can therefore account for as much as 32.5% of the overall data communication, thereby resulting in a relatively low spectral efficiency. It would therefore be beneficial to reduce the overhead in a multi-carrier packet communication system to improve the spectral efficiency of the system.

DETAILED DESCRIPTION

Figure 1:
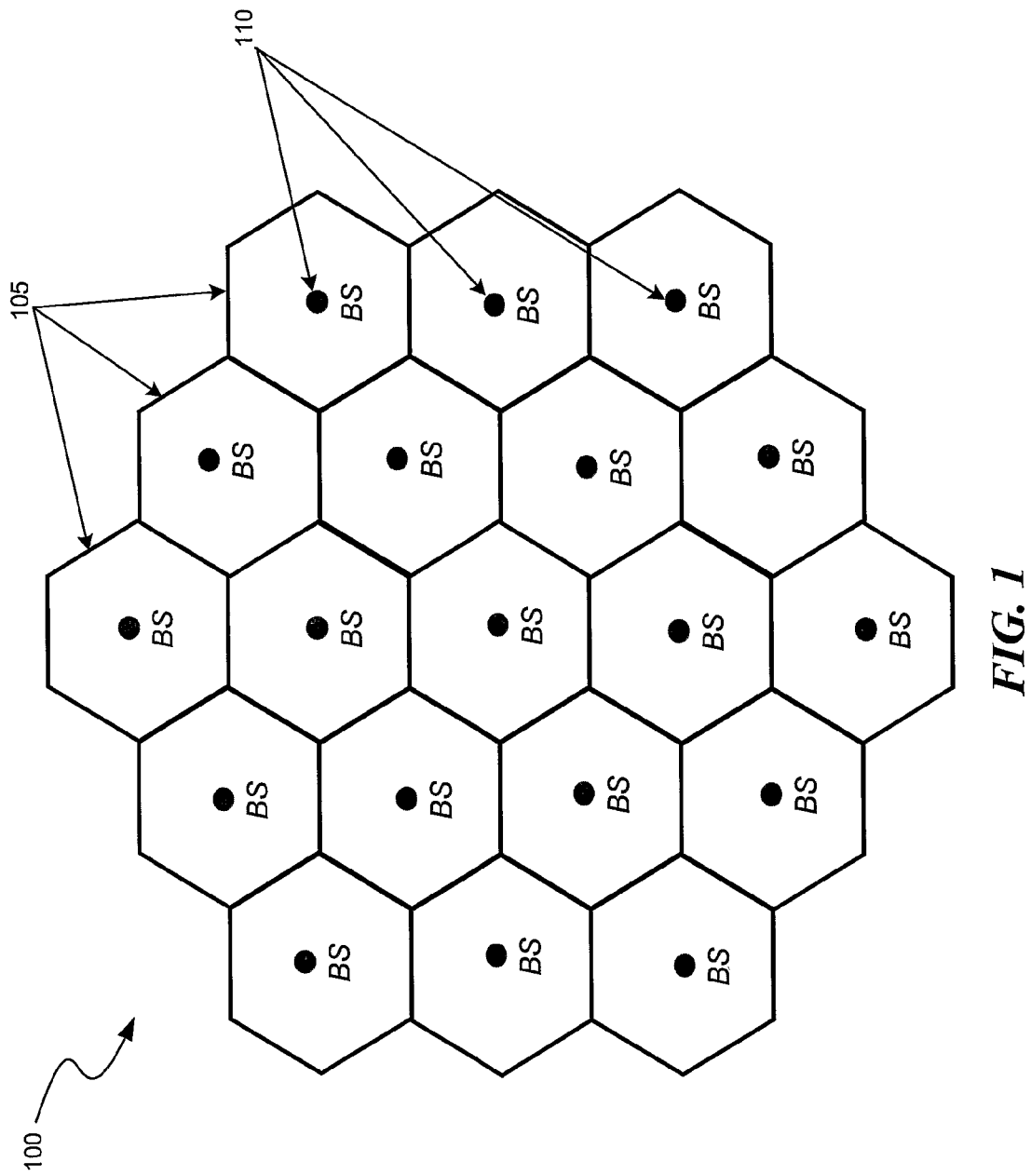
FIG. 1 illustrates the coverage of a wireless communication network that is comprised of a plurality of cells.

A system and method for minimizing the control overhead in a multi-carrier wireless communication network that utilizes a time-frequency resource is disclosed. In some embodiments, one or more zones in the time-frequency resource are designated for particular applications, such as a zone dedicated for voice-over-IP (VoIP) applications. By grouping applications of a similar type together within a zone, a reduction in the number of bits necessary for mapping a packet stream to a portion of the time-frequency resource can be achieved. In some embodiments, modular coding schemes associated with the packet streams may be selected that further reduce the amount of necessary control information.

In some embodiments, packets may be classified for transmission in accordance with application type, QoS parameters, and other properties. An application connection-specific identifier (ACID) may also be assigned to a packet stream. Both measures reduce the overhead associated with managing multiple application streams in a communication network.

In some embodiments, improved control messages may be constructed to facilitate the control process and minimize associated overhead. The control messages may include information such as the packet destination, the modulation and coding method, and the airlink resource used. Control messages of the same application type or subtype, modulation and coding scheme, or other parameter may be grouped together for efficiency.

While the following discussion contemplates the application of the disclosed technology to an Orthogonal Frequency Division Multiple Access (OFDMA) system, those skilled in the art will appreciate that the technology can be applied to other system formats such as Code Division Multiple Access (CDMA), Multi-Carrier Code Division Multiple Access (MC-CDMA), or others. Without loss of generality, OFDMA is therefore only used as an example to illustrate the present technology. In addition, the following discussion uses voice-over-IP as a representative application to which the disclosed technology can be applied. The disclosed technology is equally applicable to other applications including, but not limited to, audio and video.

The following description provides specific details for a thorough understanding of, and enabling description for, various embodiments of the technology. One skilled in the art will understand that the technology may be practiced without these details. In some instances, well-known structures and functions have not been shown or described. In detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

I. Wireless Communication Network

FIG. 1 is a representative diagram of a wireless communication network 100 that services a geographic region. The geographic region is divided into a plurality of cells 105, and wireless coverage is provided in each cell by a base station (BS) 110. One or more mobile devices (not shown) may be fixed or may roam within the geographic region covered by the network. The mobile devices are used as an interface between users and the network. Each base station is connected to the backbone of the network, usually by a dedicated link. A base station serves as a focal point to transmit information to and receive information from the mobile devices within the cell that it serves by radio signals. Note that if a cell is divided into sectors, from a system engineering point of view each sector can be considered as a cell. In this context, the terms "cell" and "sector" are interchangeable.

Figure 2:
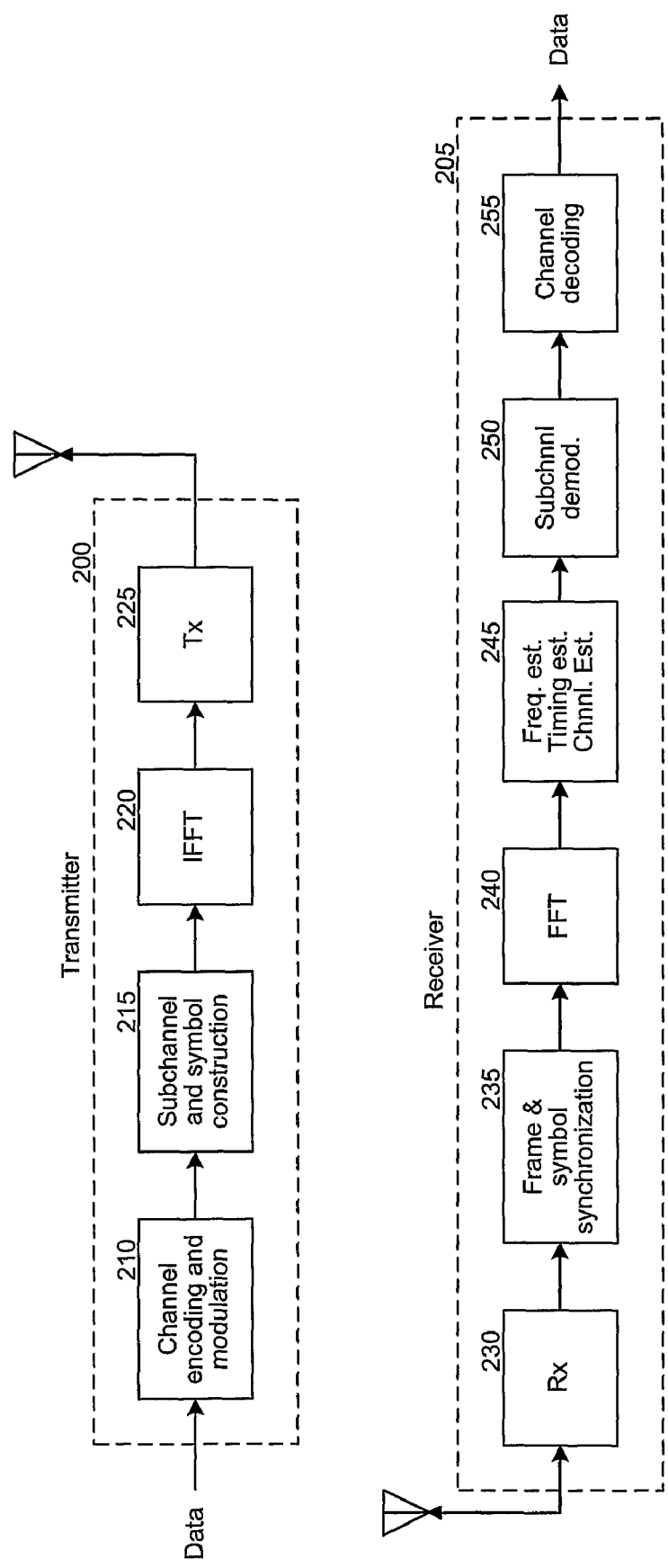
FIG. 2 is a block diagram of a receiver and a transmitter, such as might be used in a multi-carrier wireless communication network.

In a wireless communication system with base stations and mobile devices, the transmission from a base station to a mobile device is called a downlink (DL) and the transmission from a mobile device to a base station is called an uplink (UL). FIG. 2 is a block diagram of a representative transmitter 200 and receiver 205 that may be used in base stations and mobile devices to implement a wireless communication link. The transmitter comprises a channel encoding and modulation component 210, which applies data bit randomization, forward error correction (FEC) encoding, interleaving, and modulation of an input data signal. The channel encoding and modulation component is coupled to a subchannel and symbol construction component 215, an inverse fast Fourier transform (IFFT) component 220, and a radio transmitter component 225. Those skilled in the art will appreciate that these components construct and transmit a communication signal containing the data that is input to the transmitter 200. Other forms of transmitter may, of course, be used depending on the requirements of the communication network.

The receiver 205 comprises a reception component 230, a frame and synchronization component 235, a fast Fourier transform component 240, a frequency, timing, and channel estimation component 245, a subchannel demodulation component 250, and a channel decoding component 255. The channel decoding component de-interleaves, decodes, and derandomizes a signal that is received by the receiver. The receiver recovers data from the signal and outputs the data for use by the mobile device or base station. Other forms of receiver may, of course, be used depending on the requirements of the communication network.

Figure 3:
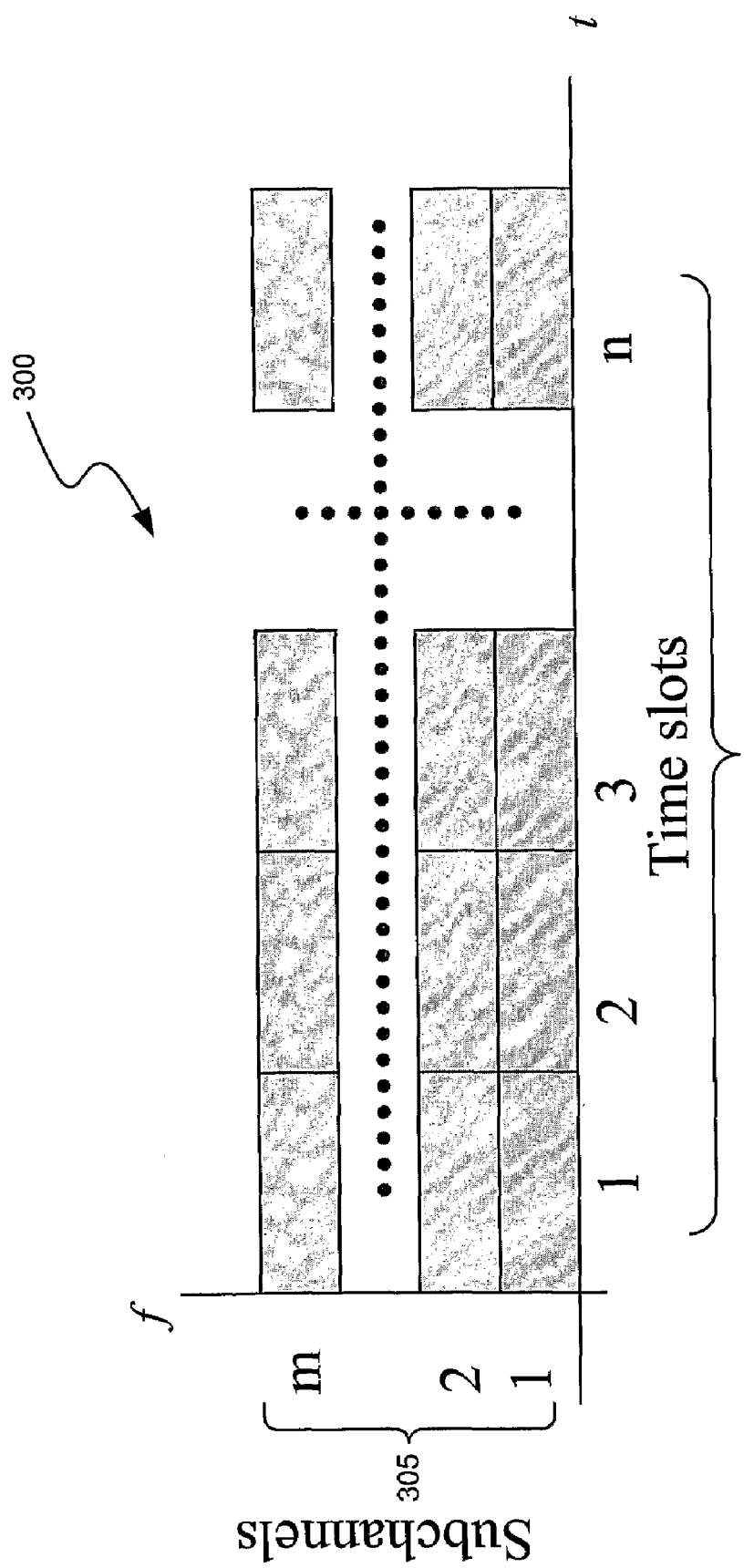
FIG. 3 is a block diagram depicting a division of communication capacity in a physical media resource.

FIG. 3 is a block diagram depicting the division of communication capacity in a physical media resource 300 (e.g., radio or cable) into frequency and time domains. The frequency is divided into two or more subchannels 305, represented in the diagram as subchannels 1, 2, ... m. Time is divided into two or more time slots 310, represented in the diagram as time slots 1, 2, ... n. The canonical division of the resource by both time and frequency provides a high degree of flexibility and fine granularity for resource sharing between multiple applications or multiple users of the resource.

Figure 4:
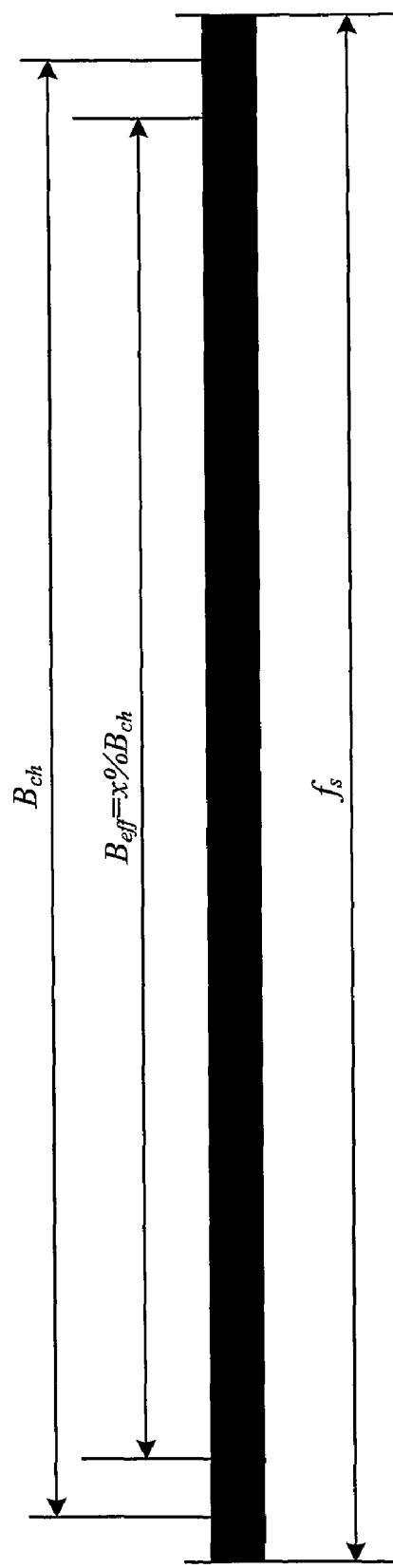
FIG. 4 is a graphical depiction of the relationship between a sampling frequency, a channel bandwidth, and usable subcarriers in a channel.

FIG. 4 is a block diagram representing the relationship between the bandwidth of a given channel and the number of usable subcarriers within that channel. A multi-carrier signal in the frequency domain is made up of subcarriers. In FIG. 4, the sampling frequency is represented by the variable $f_s$, the bandwidth of the channel is represented by the variable $B_{ch}$, and the effective bandwidth by the variable $B_{eff}$ (where the effective bandwidth is a percentage of the channel bandwidth). The number of usable subcarriers within the channel is defined by the following equation:

$$\#\_usable\_subcarriers = \frac{B_{eff}}{f_s} \times N_{fft}$$

Where $N_{fft}$ is the length of the fast Fourier transform. Those skilled in the art will appreciate that for a given bandwidth of a spectral band or channel ($B_{ch}$), the number of usable subcarriers is finite and limited, and depends on the size of the FFT, the sampling frequency ($f_s$), and the effective bandwidth ($B_{eff}$) in accordance with equation 1.

Figure 5:
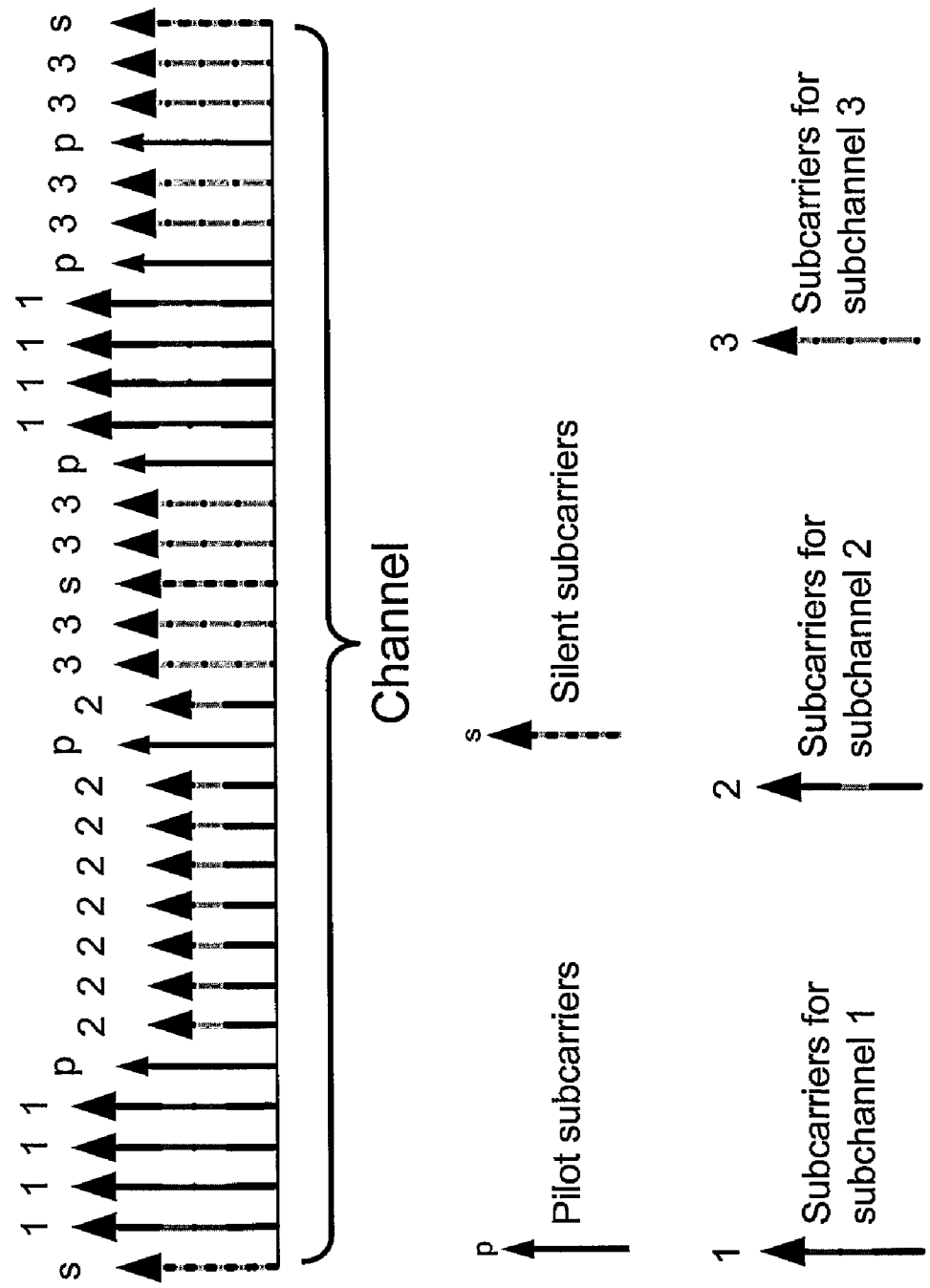
FIG. 5 is a graphical depiction of the structure of a multi-carrier signal in the frequency domain.

FIG. 5 is a signal diagram depicting the various subcarriers and subchannels that are contained within a given channel. There are three types of subcarriers: (1) data subcarriers, which carry information data; (2) pilot subcarriers, whose phases and amplitudes are predetermined and made known to all receivers, and which are used for assisting system functions such as estimation of system parameters; and (3) silent subcarriers, which have no energy and are used for guard bands and as a DC carrier. The data subcarriers can be arranged into groups called subchannels to support scalability and multiple-access. The subcarriers forming one subchannel may or may not be adjacent to each other. Each mobile device may use some or all of the subchannels.

A multi-carrier signal in the time domain is generally made up of time frames, time slots, and OFDM symbols. A frame consists of a number of time slots, and each time slot is comprised of one or more OFDM symbols. The OFDM time domain waveform is generated by applying an inverse-fast-Fourier-transform (IFFT) to the OFDM symbols in the frequency domain. A copy of the last portion of the time domain waveform, known as the cyclic prefix (CP), is inserted in the beginning of the waveform itself to form an OFDM symbol.

In some embodiments, a mapper such as the subchannel and symbol construction component 215 in FIG. 2 is designed to map the logical frequency/subcarrier and OFDM symbol indices seen by upper layer facilities, such as the MAC resource scheduler or the coding and modulation modules, to the actual physical subcarrier and OFDM symbol indices. A contiguous time-frequency area before the mapping may be actually discontinuous after the mapping, and vice versa. On the other hand, in a special case, the mapping may be a "null process", which maintains the same time and frequency indices before and after the mapping. The mapping process may change from time slot to time slot, from frame to frame, or from cell to cell. Without loss of generality, the terms "resource", "airlink resource", and "time-frequency resource" as used herein may refer to either the time-frequency resource before such mapping or after such mapping.

II. Airlink Resource Zones

Various technologies are now described that may be utilized in conjunction with the wireless communication network 100 in order to reduce the amount of control overhead associated with the use of system resources. By reducing the control overhead, greater spectral efficiency is achieved allowing the system to, among other benefits, maximize the amount of simultaneously supported communications.

Figure 6:
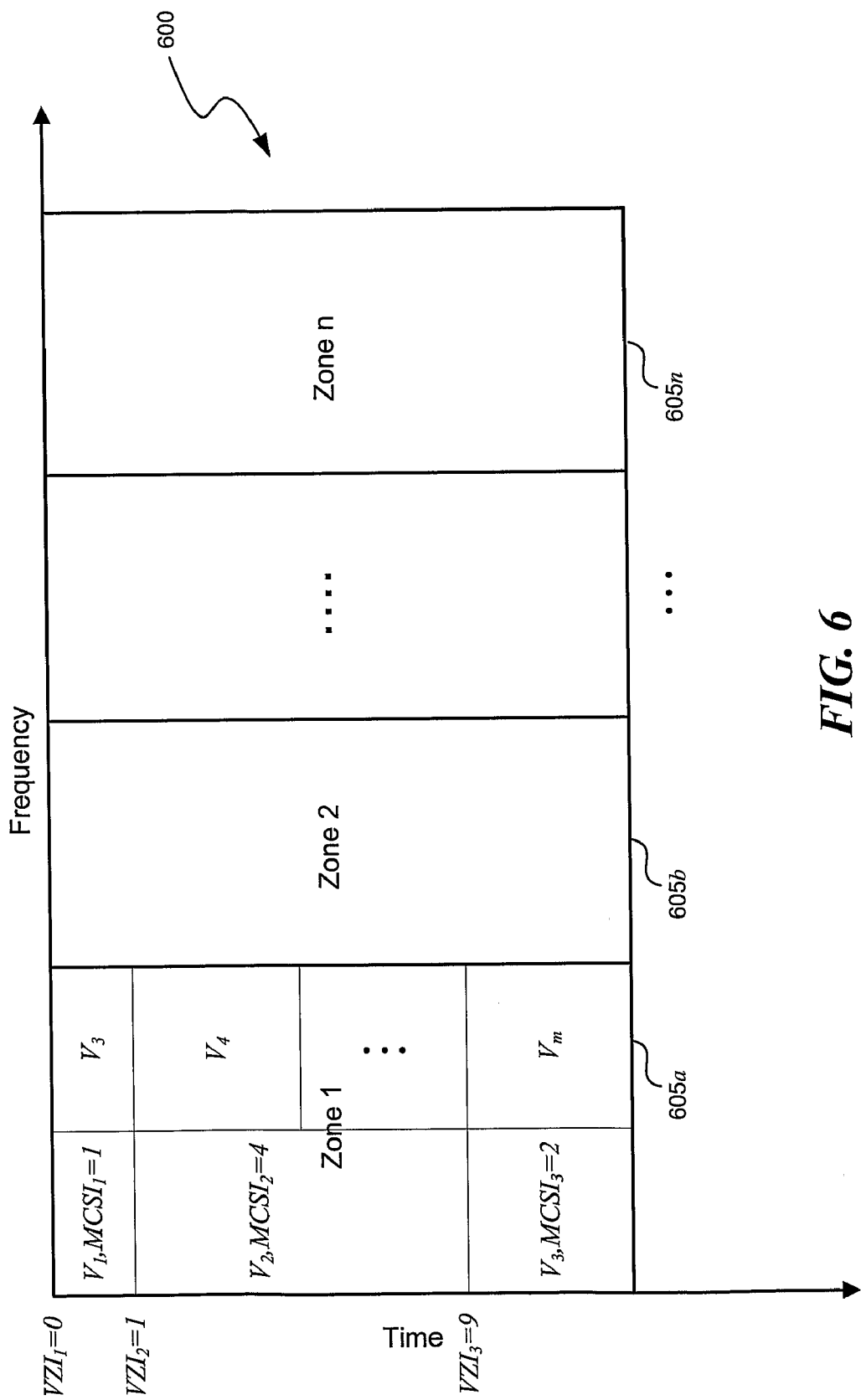
FIG. 6 is a block diagram of a time-frequency resource utilized by a wireless communication network.

FIG. 6 is a map of a time-frequency resource 600 that is allocated for use by the wireless communication network 100. As described above, in a typical wireless system based on the IEEE 802.16 standard ("WiMAX"), multiple packet streams are established for each mobile device to support different applications. At the medium access control (MAC) layer, each packet stream is mapped into a wireless connection. As a result, various applications carried in packet streams may be spread throughout the available time-frequency resource. To overcome the inefficiencies associated with maintaining this mapping, FIG. 6 depicts an alternative way of managing multiple packet streams. The time-frequency resource 600 may be divided into one or more zones 605a, 605b, ... 605n. Each of the zones 605a, 605b, ... 605n is associated with a particular type of application. For example, zone 605a may be associated with voice applications (e.g., VoIP), zone 605b may be associated with video applications, and so on. As will be described in additional detail below, by grouping like applications together the amount of control overhead in MAC headers is reduced. Zones may be dynamically allocated, modified, or terminated by the system.

When applications of a similar type are grouped together within a zone, a reduction in the number of bits necessary for mapping a packet stream to a time-frequency segment can be achieved. In some embodiments, the identification of the time-frequency segment associated with a particular packet stream can be indicated by the starting time-frequency coordinate and the ending time-frequency coordinate relative to the starting point of the zone. The granularity in the time coordinates can be one or multiple OFDM symbols, and that in the frequency coordinates can be one or multiple subcarriers. If the time-frequency resource is divided into two or more zones, the amount of control information necessary to map to a location relative to the starting point of the zone may be significantly less than the amount of information necessary to map to an arbitrary starting and ending coordinate in the entire time-frequency resource.

Within each zone 605a, 605b, ... 605n, the time-frequency resource may be further divided in accordance with certain rules to accommodate multiple packet streams $V_1, V_2, \ldots V_m$. For example, as depicted in FIG. 6, zone 605a is divided into multiple columns and the packet streams are arranged from top down in each column and from left to right across the columns. The width of each column can be a certain number of subcarriers. Each packet stream $V_1, V_2, \ldots V_m$ may be associated with an application. For example, $V_1$ is the resource segment to be used for the first voice packet stream, $V_2$ is the resource segment to be used for the second voice packet stream, etc. While the zone 605a is divided and the packet streams numbered starting at an origin of the zone, it will be appreciated that the division of the time-frequency resource in accordance with certain rules may start at other origin locations within the zone as well. Segments within each zone may be dynamically allocated by the system as requested and released by the system when expressly or automatically terminated.

When the zones are further subdivided into time-frequency segments in accordance with certain rules, a mapping of packet streams to segment may be achieved using a one-dimensional offset with respect to the origin of the zone rather than the two-dimensional (i.e. starting time-frequency coordinate and ending time-frequency coordinate relative to the starting point of the zone) mapping method discussed above. Calculation of such an offset may require knowledge of a modulation and coding scheme that is associated with a particular packet stream. For example, Table 1 below sets forth representative modulation and forward-error correction (FEC) coding schemes (MCS) that may be used for voice packet streams under various channel conditions.

TABLE 1

| MCSI | Modulation | Coding rate | Information bits | Raw symbols | Units |
|---|---|---|---|---|---|
| 1 | 16QAM | ½ | 160 | 80 | 1 |
| 2 | QPSK | ½ | 160 | 160 | 2 |
| 3 | QPSK | ¼ | 160 | 320 | 4 |
| 4 | QPSK | ⅛ | 160 | 640 | 8 |

In some embodiments, the MCS may be selected to utilize moauiar resources. For example, as illustrated in Table 1, 80 raw modulation symbols are needed to transmit 160 information bits using 16QAM modulation and rate-½ coding, the highest available MCS in the table. The resource utilized by this highest MCS is called a basic resource unit ("Unit"), i.e., 80 raw symbols in this example. The resource utilized by other MCS is simply an integer multiple of the basic unit. For example, four units are required to transmit the same number of information bits using QPSK modulation with rate-¼ coding. The MCS index (MCSI) conveys the information about modulation and coding schemes. For a known vocoder, MCSI also implies the number of AMC resource units required for a voice packet. Those skilled in the art will appreciate that coding and signal repetition can be combined to provide lower coding rates. For example, rate-⅛ coding can be realized by a concatenation of rate-½ coding and 4-time repetition.

The decision process for selecting the proper MCS of a packet can vary by application. In some embodiments, the process for voice packets can be more conservative than that for general data packets due to the QoS requirements of the voice applications. For example, when the signal to interference noise ratio (SINR) is used as a threshold for selecting the MCS, the threshold value for voice packets is set higher than that for general data packets. For example, the SINR threshold of QPSK with rate-½ coding for voice packets is 12 dB, while that for general data packets is 10 dB.

If a MCS from Table 1 is selected for each packet stream contained in a particular zone, the offset to a segment representing a particular packet stream may be easily calculated. For example, an index $VZI_1, VZI_2, \ldots VZI_m$ is shown at the origin of each segment that is contained in the zone 605a. The index for any selected packet stream is defined as the sum of all basic resource units associated with each packet stream preceding the selected packet stream, with an optional adjustment depending on the location where the division of the time-frequency resource is started (typically no adjustment is required since the division starts at the origin of the zone). For example, the location index for the first voice packet stream is $VZI_1=0$ since it starts at the origin of the zone 605a. The first packet stream has an MCS of 1, which implies that one basic resource unit is used. As a result, the index for the second voice packet stream is $VZI_2=1$. The second packet stream has an MCS of 4, which implies that eight basic resource units are used. As a result, the index for the third voice packet stream is $VZI_3=9$, arrived by summing the basic resource units used for the preceding first and second packet streams.

Using basic resource units as the granularity of a location offset to the packet packet stream reduces the number of bits required to represent its location with the zone 605a. For example, to support a maximum of 64 VoIP calls in a cell, a maximum of 64×8=512 units might be used, assuming that every voice packet is transmitted using the lowest MCS. Therefore, a 9-bit number is sufficient to represent a VZI. In practice, different voice packets may be transmitted using different MCSs, some with MCSI=1, some with MCSI=4, so on so forth. According to statistics, a shorter bit-length than the maximum needed, for example 8 bits, may be used for VZI for practical purpose.

In some embodiments, control information necessary to map a packet stream to a resource segment may be still further reduced. In the case where an MCS is used with packet streams that are located sequentially in the zone. the index of a packet can be inferred from the MCSI of the packets located before the subject packet. For example, if the first voice packet stream uses $MCSI_1=1$, 16QAM with ½ coding, and the second voice packet stream uses $MCSI_2=4$, QPSK with ⅛ coding, then the first two voice packet streams occupy 1+8=9 units, and the starting location of the third voice packet stream is the 9th unit. Rather than encode the index for each packet stream in the control information, the index can be omitted in the control message and the offset from the origin of the zone calculated as necessary.

Allocation of the time-frequency resource 600 can be carried out in a variety of ways. In some embodiments, an application zone may contain all subcarriers of one or multiple OFDM symbols or time slots. In some embodiments, the definition of an application zone, such as the location and size of the zone, may be different from cell-to-cell 105. In some embodiments, in order to avoid inter-cell interference the zones of similar applications are allocated at different locations in neighboring cells. For example, voice applications may be located at a lower frequency range in the time-frequency resource in one cell, and at a higher frequency range in the time-frequency range in an adjacent cell. In some embodiments, the system allocates a fixed amount of resource to each voice connection. The system uses AMC and matches it with adaptive multi-rate (AMR) voice coding to improve the voice quality. Moreover, unused resources in one application zone may be allocated for other applications.

Figure 9:
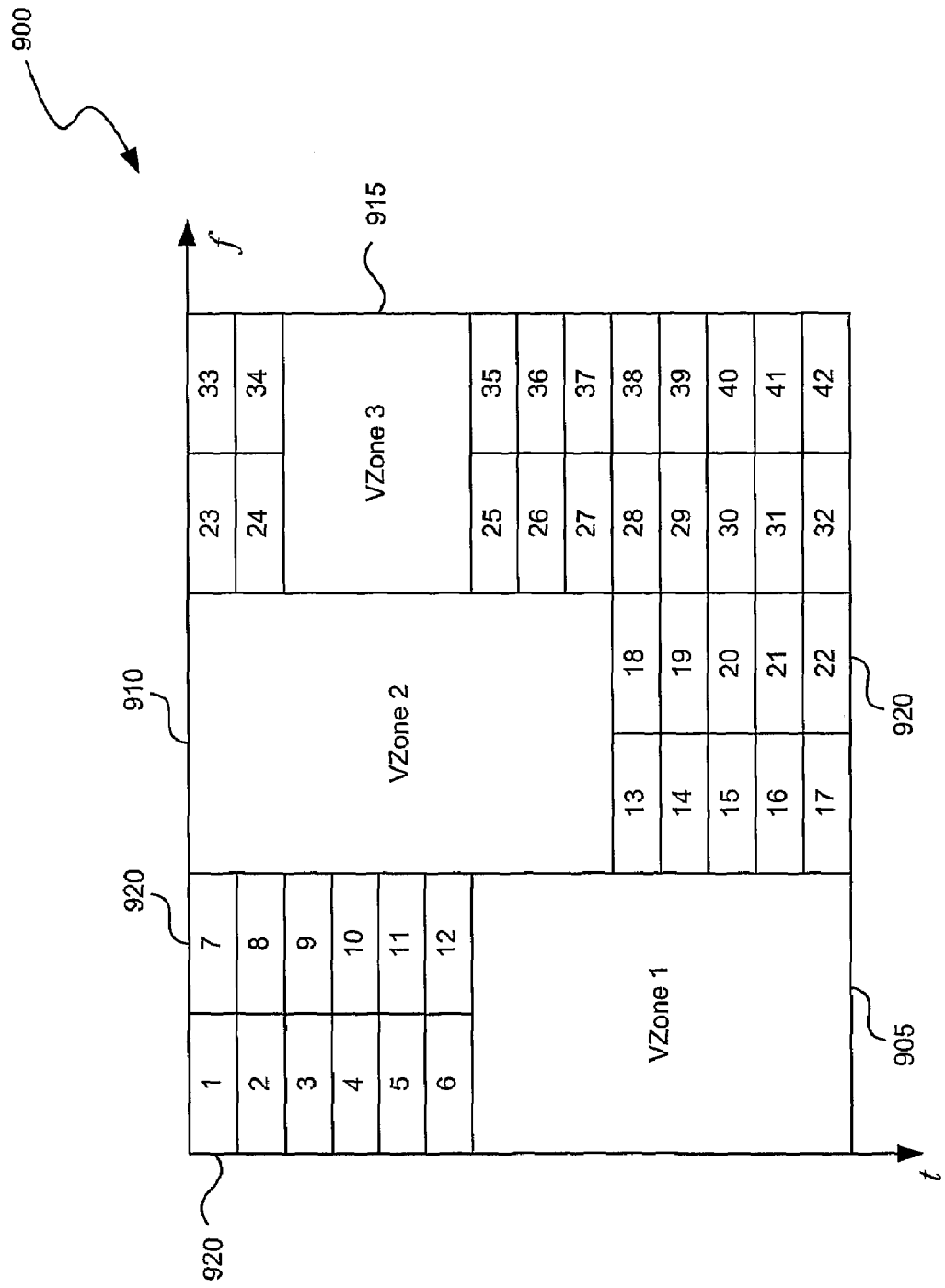
FIG. 9 is a block diagram of a special resource zone with unit sequence defined in time-first order.

In a system with one or multiple application zones, the remaining resource unused by the application zones can be treated as a special resource zone. The special resource zone may be irregular in shape. For example, FIG. 9 depicts a time-frequency resource 900 having three defined zones 905, 910, and 915. The remaining resource area that is shaded in the figure represents the special resource zone. The MAC scheduler may track the time-frequency resources in this special zone and broadcast the resource allocation in a special zone MAP message. In some embodiments, the special zone MAP message explicitly identifies the resource zone, for example using the time and frequency coordinates of a resource block. A mobile device can identify its own resource by decoding the MAP message.

In some embodiments, both the base station and the mobile device share the configuration information of the special resource zone, and view the special zone as a contiguous resource zone. The MAP message only includes the resource allocation information in the special resource zone, using connection ID (described below), resource identification parameters and MCS index.

In some embodiments, the MAP message can be further compressed if the special resource zone is further divided into a sequence of pre-defined resource units. For example, the shaded area in FIG. 9 has been further divided into forty-two resource units 920, first numbered sequentially along the time axis and then continuing in columns along the frequency axis. If the size of each resource unit is pre-defined, the location within the special resource zone may be determined based on a mapping to a sequence number.

III. Application Connection IDs

When a mobile device enters a wireless network, it is first assigned a basic connection identification (BCID) for each direction of the wireless connection: downlink and uplink. A BCID can be used for control messages or generic (unclassified) application connections. The BCID for downlink may or may not be the same as that of the uplink.

Figure 7:
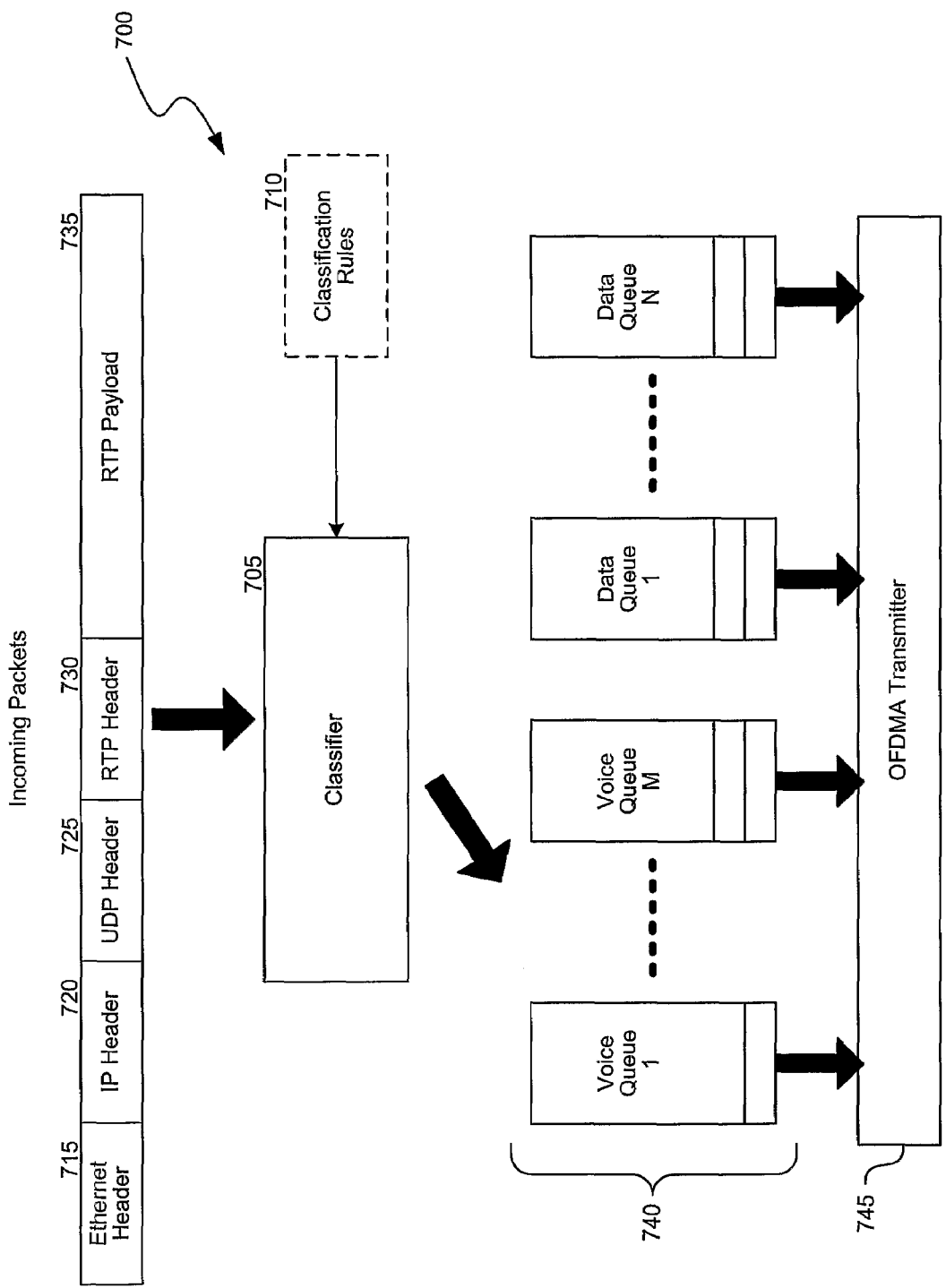
FIG. 7 is a block diagram of a classifier for classifying received packets by application, QoS, or other factor.

In some embodiments, a classification of packet streams may be performed by the system. FIG. 7 is a block diagram of a system component 700 for receiving IP packets and sorting the received packets into various streams. The system component 700 includes a classifier 705 having associated classification rules 710. The classifier receives incoming packets, each packet having various header information such as an Ethernet header 715, an IP header 720, a UDP header 725, an RTP header 730 and an RTP payload 735. The packets are classified by the classifier 705 and output into different application data queues 740 where they will subsequently be transmitted by an OFDMA transmitter 745.

The classifier 705 is able to classify the packets based on application type, quality of service (QoS) requirement, or other properties. For example, packets from a voice application stream are identified based on a special value in the type of service (ToS) field in the IP header 720 of the packets. A new combination of RTP/UDP/IP headers with the special IP ToS field value indicates a new voice application stream. Such a new stream is identified by peeking into voice session setup protocol messages, such as session initiation protocol (SIP). The classification performed by the classifier is based on one or more classification rules 710. The classification rules can be configured statically or dynamically by a control process. Each classification rule is defined using parameters, such as application type, QoS parameters, and other properties that may be determined from the received packets.

In some embodiments, the incoming packets may also be assigned an application connection-specific identifier (ACID) in addition to or in lieu of a BCID. Each ACID can be assigned to a corresponding packet stream. For example, an ACID can be assigned to voice packets that together make up a voice application. When an ACID is assigned to a voice application, the ACID may also be referred to as a voice connection ID (VCID). As another example, an ACID can be assigned to a packet stream that requires a particular QoS. Furthermore, an application packet stream can be further classified into different sub-types, based on certain properties of that application. For example, voice applications can be further classified into different sub-types based on the voice source coding (vocoder) methods (e.g., G.711 and G.729A). When further classified in this matter, the sub-types may each be assigned their own ACID. For certain multi-casting applications, an ACID may also be shared by multiple base stations or mobile devices.

Once established, the connection IDs, including BCIDs and ACIDs, are disseminated, through broadcasting messages for example, to the corresponding base station(s) and mobile device(s) for proper packet transmission and reception. As was previously discussed, the medium access control (MAC) scheduler may allocate specific zones of airlink resources for certain types of packet streams.

A connection ID is released once the wireless system determines that there is no need to continue the connection. For example, a voice connection and its VCID are released once the system detects deactivation of the voice stream. In some embodiments, the voice connection is deactivated if the voice session disconnect is detected through snooping SIP signaling. In some embodiments, the voice connection is released if there is no voice packet activity on the connection for a certain period of time.

In some embodiments, the same bit length is used in different types of connections IDs, including BCIDs and ACIDs. In some embodiments, different types of connection IDs may have different bit lengths. For example, in a typical implementation for voice applications, a BCID may be 16-bits to accommodate a large number of mobile devices and unclassified applications, while a VCID is 6-bits to accommodate up to 64 simultaneous voice connections in a cell. A shorter ACID length is beneficial for reducing control overhead, especially when an application utilizes many small data packets, such as VoIP packets.

In some embodiments, an ACID is further augmented by other properties of the utilized airlink resources, such as time or frequency indices, to identify an application connection. This can be used to further reduce ACID bit length or to increase the maximum number of accommodated application connections given a certain ACID bit length. For example, a voice codec generates voice application data periodically. The allocation period is usually a multiple of the airlink frame duration. In this case, the airlink frame number can be combined with a VCID to identify a voice connection. For example, the voice codec of G.723.1 generates a voice frame once every 30 milliseconds. The MAC scheduler allocates airlink resource to such a voice connection once every 30 ms. In a wireless cellular system using 5 ms frame duration, a single VCID can be shared by 6 voice streams, each associated with a different frame number to uniquely identify a voice connection.

IV. Control Messages

When airlink resource zones or application-specific IDs are utilized by the system, various improved control messages, often called Information Elements (IEs), may be constructed to facilitate the control process and minimize the control overhead. Various control message improvements are described herein.

In some embodiments, the IE is sent prior to transmitting an application packet to indicate information associated with the packet, such as the packet destination, the modulation and coding method, and the airlink resource used. For example, the IE for a voice packet may include the VCID (indicative of the packet destination), the MCSI (encoding scheme), and the VZI (index to location fo the packet stream within the airlink resource). In some embodiments, the VCID is 6 bits, the MCSI is 2 bits, and the VZI is 8 bits, thereby resulting in a 2-byte IE overhead for each voice packet. Alternatively, the IE for a voice packet may include only the VCID and the MCSI, with the VZI inferred from the MCSIs of previous packet streams in the airlink resource as described above. When using only the VCID and MCSI, the IE overhead for each voice packet is reduced to only 1 byte. Additional control information, such as power control information, can be added to the IE with additional bit fields. The reduction in control bits improves the overall bandwidth efficiency of the wireless communication network.

In some embodiments, a base station sends the IE before a downlink packet to inform the mobile device for proper reception of the packet, and the base station sends the IE before an uplink packet to inform the mobile device for proper transmission of the packet. The downlink and uplink packet IEs may be separately grouped together. The IEs may be broadcasted or multi-casted to corresponding destinations.

Figures 8A, 8B:
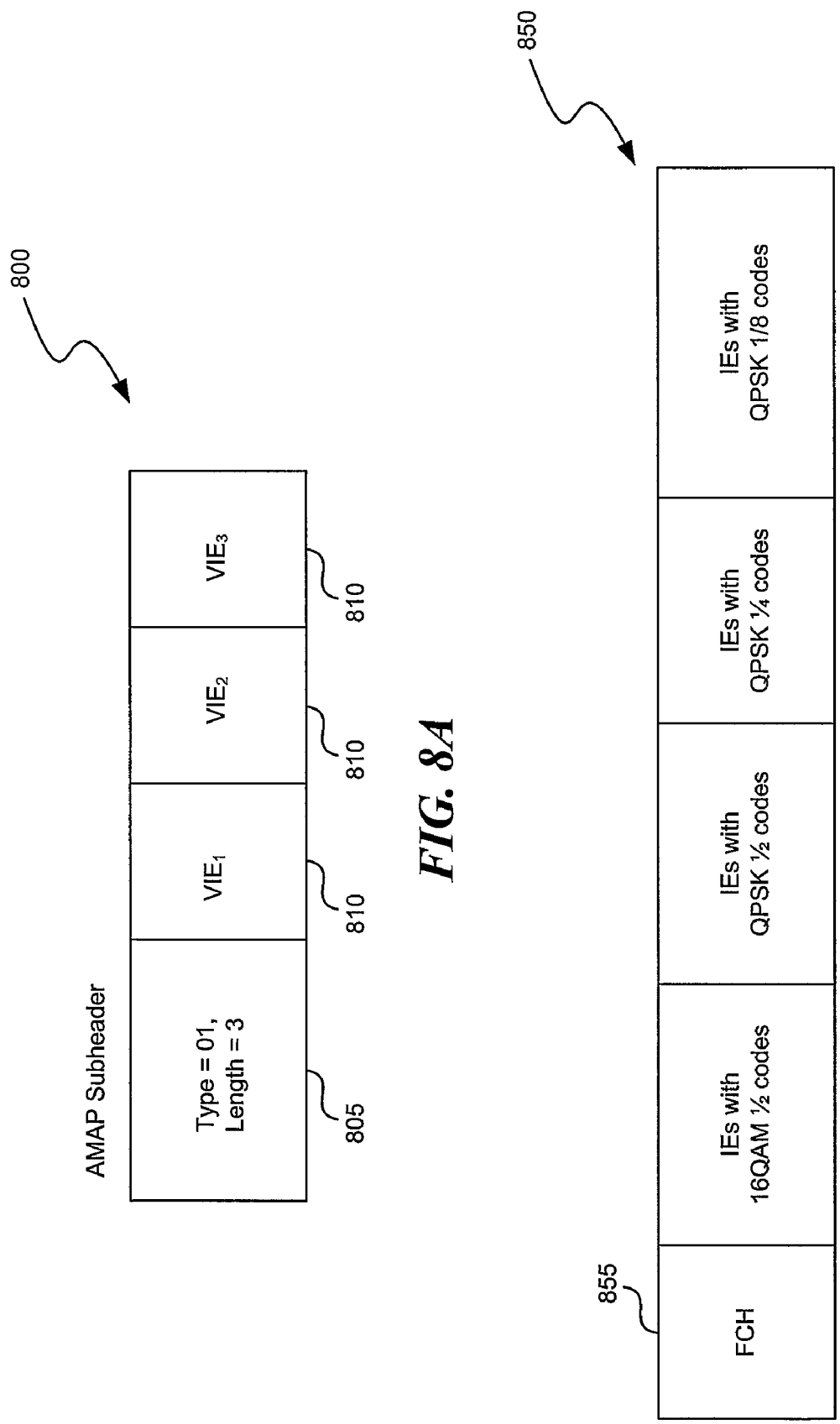
FIGS. 8A and 8B are block diagrams of representative control message formats.

In some embodiments, the IEs of the same application type or subtype may be grouped together. A special field, called an Application MAP (AMAP) subheader, for a specific application type, may be added to the IE. The subheader may indicate the application type and the length of the IE group. FIG. 8A is a block diagram of a representative IE 800 with an AMAP subheader 805, in this case used for voice applications. The AMAP subheader 805 includes a type variable and a length variable. As depicted in FIG. 8A, type=01 indicates that the application type is voice. Length=3 indicates that the subheader is followed by three voice IEs. The remainder of the IE contains the three voice IEs 810*a*, 810*b*, and 810*c*. For example, if the AMAP subheader was associated with streams in the zone 605*a* depicted in FIG. 6, then voice IE 810*a* would pertain to packet stream $V_1$, voice IE 810*b* would pertain to packet stream $V_2$, and voice IE 810*c* would pertain to packet stream $V_3$. Those skilled in the art will appreciate that the although text is used to indicate the contents of the IE in FIG. 8A, in an actual implementation the text would be replaced by appropriately coded information.

In some embodiments, the IEs for all packets that are transmitted with the same modulation and coding schemes (MCS) are grouped together for efficiency. FIG. 8B is a block diagram of a block 850 of IEs that are grouped by MCS. A frame control header (FCH) 855 or other control message is transmitted prior to the block to indicate the length and the MCS used for each segment of the block. In some embodiments, adaptive modulation and coding (AMC) is used for the transmission of the IE's. A special rule, which is known to both base stations and mobile devices, can be used to determine the IE MCS, based on the MCS of its corresponding packet for proper reception of the IE. In some embodiments, the MCS for an IE is maintained the same as that of its corresponding application packet. In some embodiments, the MCS for an IE is one level more conservative than that of its corresponding packet. For example, if the MCSI for a packet is 2 (QPSK with rate-½ coding), then the MCSI for its IE is 3 (QPSK with rate-¼ coding).

V. Voice Activity Detection

Typical voice conversations contain approximately 50 percent silence. In order to take advantage of the fact that about half of the time data does not need to be transmitted at the same rate as when a user is speaking, the system may rely upon detecting the period of silence and reducing the effective data transfer rate during that period. The silence period in conversation is detected by a vocoder using technologies such as Voice Activity Detection (VAD). Voice packets are only generated when voice activity is detected. During the silence period, the voice packet data rate is greatly reduced.

In addition to reducing the voice packet data rate during periods of silence, the bandwidth allocation for the voice connection may also be reduced. The MAC scheduler at the base station may use the indication of voice activity to adjust the bandwidth allocation for the voice connection. In the uplink direction, the mobile device sends a special MAC message once a VAD indication is received from its vocoder. The MAC message indicates to the base station that the voice data rate is being temporarily reduced. When such an indication is received, the MAC scheduler can reduce the airlink resource allocated to the voice connection. Similarly, if the VAD indicates new voice activity, the mobile device notifies the base station using a MAC message and the original resource allocation is re-applied to the voice connection.

In the downlink direction, if there is no voice packet to be transmitted over a voice connection, the MAC scheduler allocates the resource to other voice connections. As a consequence, a resource block previous allocated for the connection in a particular zone may become vacant. Several methods can be used to deal with such fragmentation in the zone.

In some embodiments, the MAC scheduler at the base station reallocates the resource with the objective of minimizing the impact to other voice connections, such as their adaptive modulation and coding processes.

In some embodiments, the MAC scheduler maintains the resource allocation of the other voice connections, and allocates the resource vacated by the silent voice connection to new voice connections or other application packets.

Figure 10A:
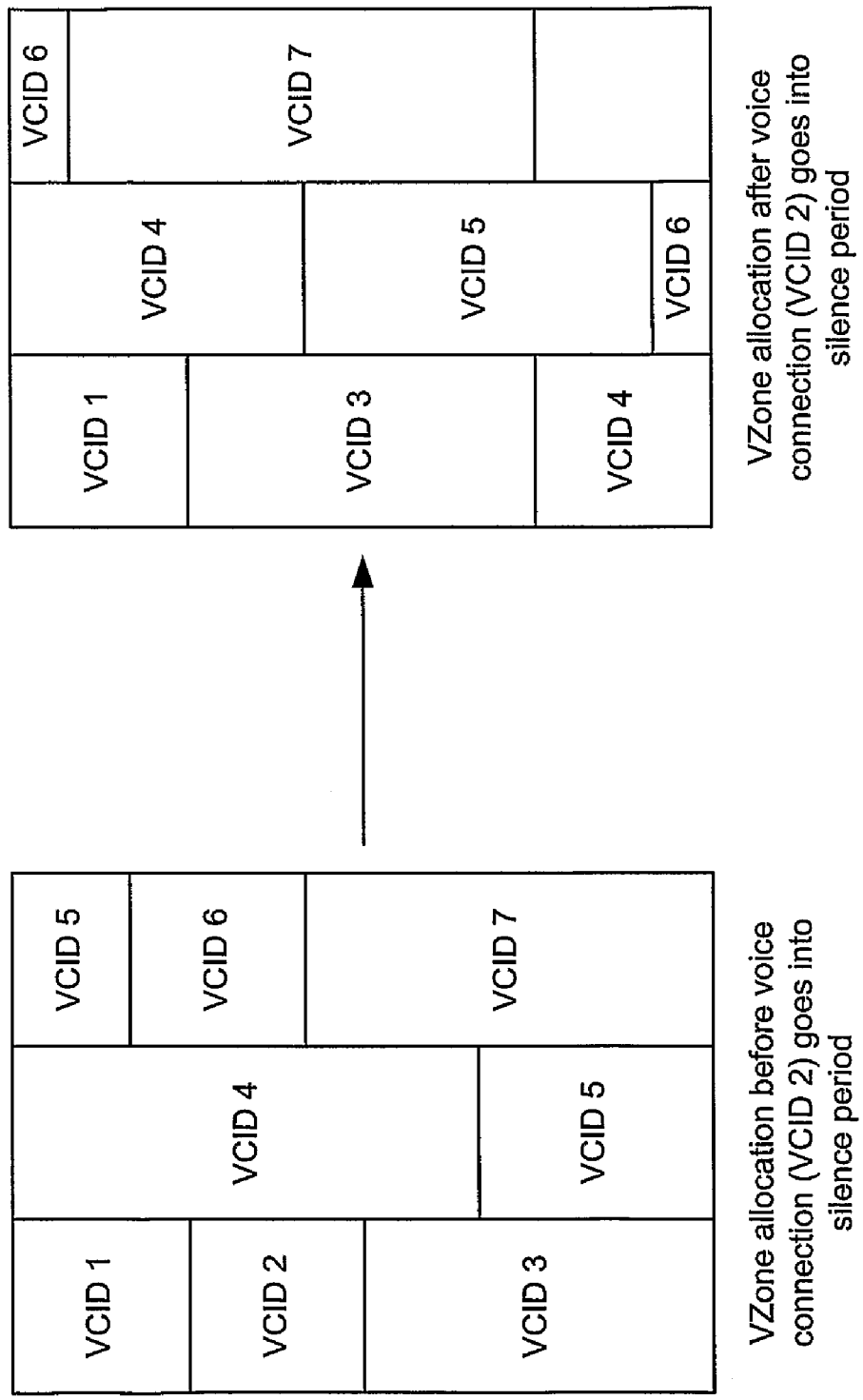
FIGS. 10A-10C are block diagrams illustrating the reallocated of resources within a resource zone.

In some embodiments, the MAC scheduler moves all the subsequent allocations up to fill the resource gap. As shown in FIG. 10A, once a voice connection, identified by VCID 2 enters a silent period, the other voice connections are moved by the MAC scheduler to occupy the resource vacated by VCID 2.

Figure 10B:
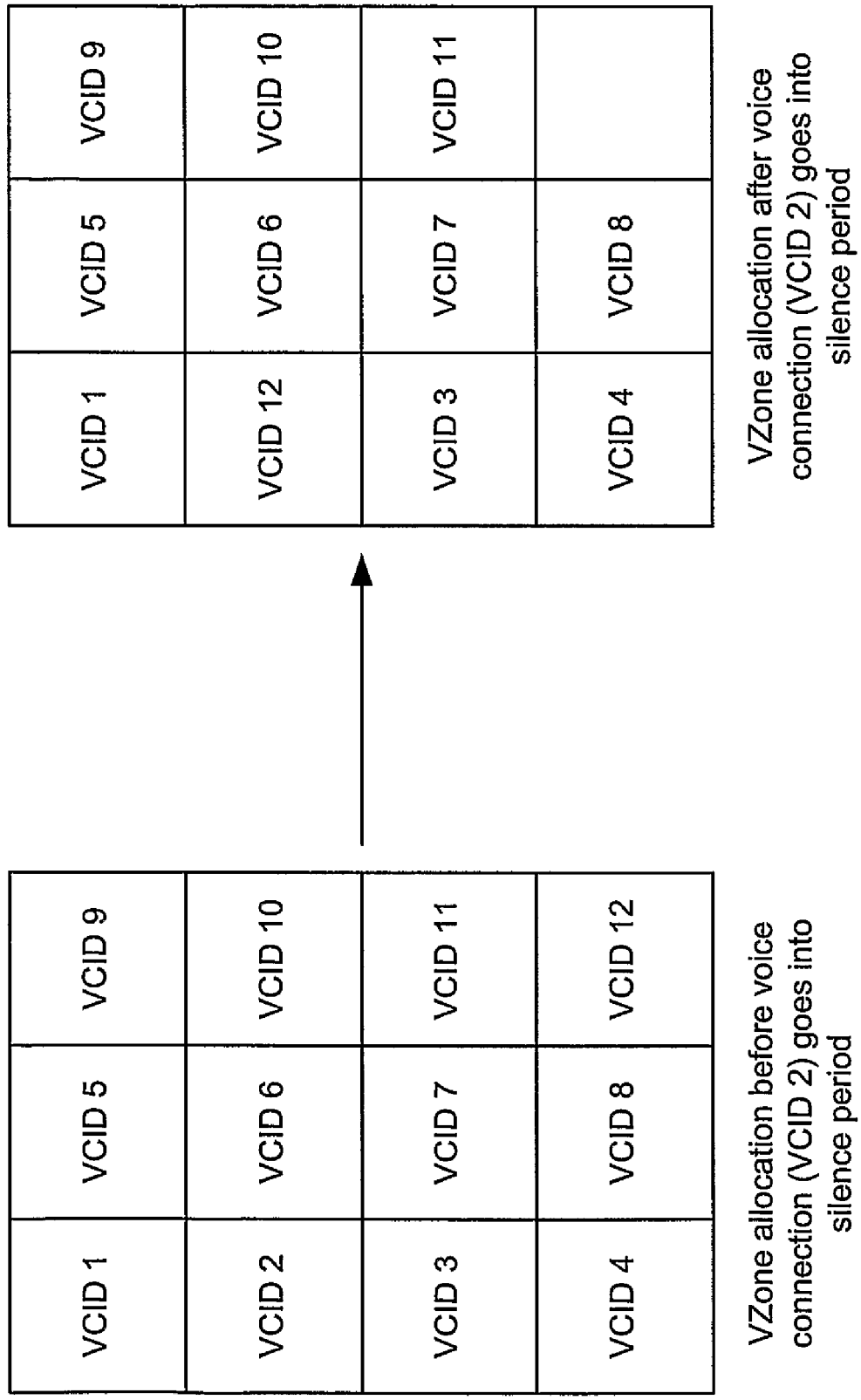

In some embodiments, the MAC scheduler uses the last voice time-frequency resource in the same zone to fill the resource gap of a silent voice connection. FIG. 10B illustrates such a case, when the MAC scheduler moves the last voice connection VCID 12 to occupy the resource allocation gap that is vacated by the voice connection VCID 2.

Figure 10C:
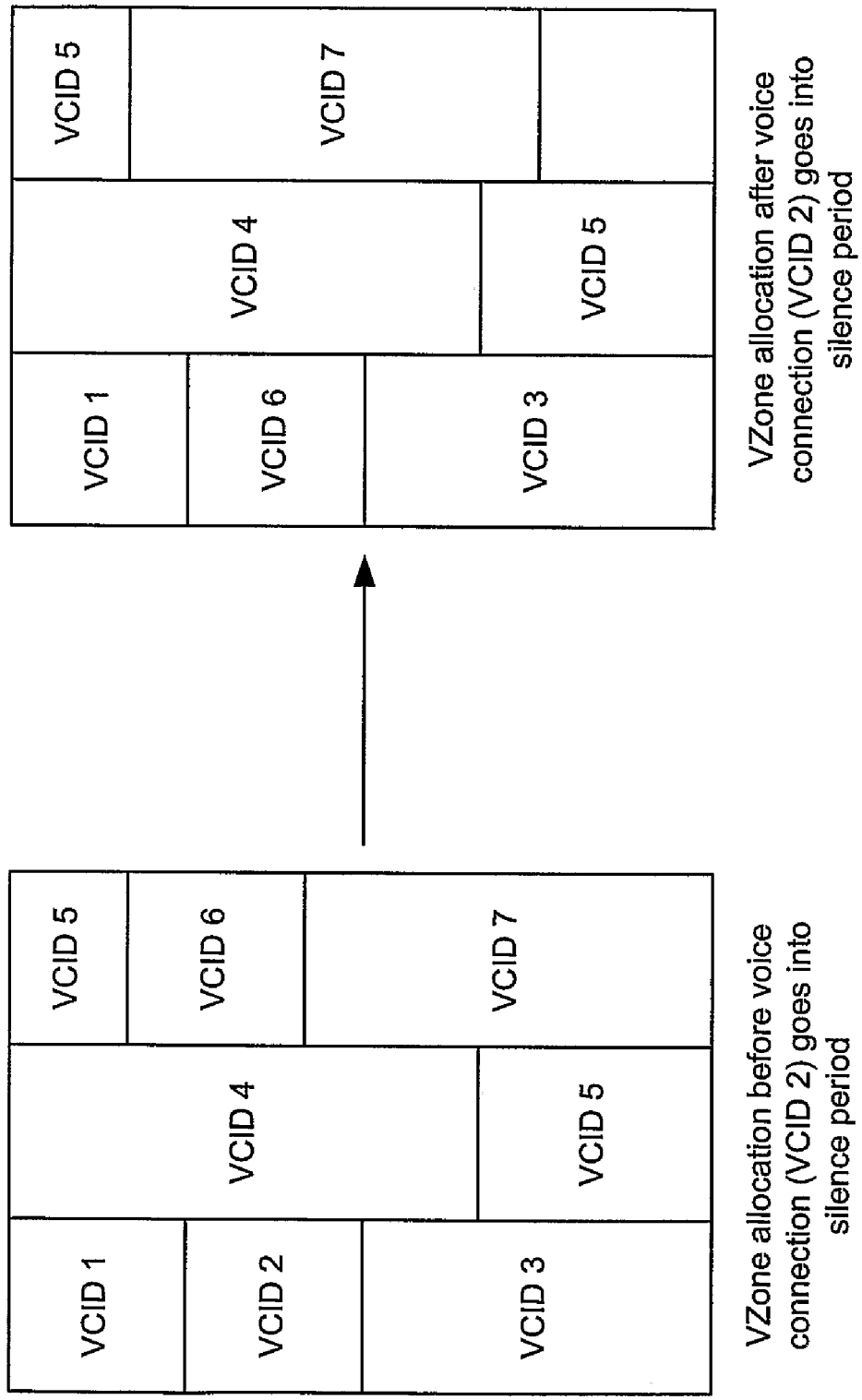

In some embodiments, the MAC scheduler uses the last voice time-frequency resource that has the same coding and modulation scheme, and is contained in the same zone, to fill the resource gap. The resource gap that is introduced by such a replacement is then filled by the voice time-frequency resource that is subsequent to the voice time-frequency resource that was moved. As shown in FIG. 10C, voice connection VCID 6 uses the same coding and modulation scheme as voice connection VCID 2, and is the last connection having that scheme in the zone. When voice connection VCID 2 goes into a silent period, the MAC scheduler allocates the voice connection VCID 2 resource to voice connection VCID 6. The MAC scheduler then moves resources after voice connection VCID 6, specifically VCID 7 in FIG. 10C, to occupy the resource allocation gap that is caused by moving voice connection VCID 6.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes are presented in a given order, alternative embodiments may perform routines having steps in a different order, and some processes may be deleted, moved, added, subdivided, combined, and/or modified to provide alternative or subcombinations. Each of these processes may be implemented in a variety of different ways. Further any specific numbers noted herein are only examples: alternative implementations may employ differing values or ranges.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

We claim:

1. A method of communication between base stations and mobile devices in a multi-carrier packet communication system that utilizes a time-frequency resource and covers a plurality of geographic cells, the method comprising:
   allocating a zone in the time-frequency resource, wherein:
      the zone is designated for a type of application and is capable of carrying two or more packet streams associated with the type of application, each of the two or more packet streams associated with the type of application utilizing one of a plurality of modulation and coding schemes, the plurality of modulation and coding schemes utilizing a basic time-frequency resource unit and integer multiples of the basic time-frequency resource unit; and
      the portion of the time-frequency resource falling outside of the zone is capable of carrying two or more packet streams not associated with the type of application;
   for at least some of the two or more packet streams within the zone, creating a control message associated with each packet stream wherein the control message is used in part to ensure proper communication of the packet stream;
   aggregating the created control messages associated with each packet stream in accordance with a common characteristic of the packet streams; and
   transmitting the control messages in a group.

2. The method of claim 1, wherein the common characteristic is the coding and modulation scheme of the packet streams.

3. The method of claim 1, wherein the common characteristic is a location of the packet stream within the time-frequency resource.

4. The method of claim 1, further comprising adding a header to the group of control messages, wherein the header comprises the number of control messages, the length of the control messages, and the common characteristics of the associated packet streams.

5. The method of claim 1, wherein the zone in one geographic cell is assigned to a different time-frequency location in the time-frequency resource than the zone in a neighboring geographic cell in order to mitigate inter-cell interference.

6. The method of claim 1, wherein the packet streams are transmitted in orthogonal frequency division multiplexing (OFDM) symbols, and wherein logical subcarriers and OFDM symbol indices seen by upper layer facilities are mapped to actual physical subcarrier and OFDM symbol indices.

7. The method of claim 1, wherein the zone allocated in the time-frequency resource is associated with video applications.

8. The method of claim 1, wherein the zone allocated in the time-frequency resource is further subdivided into time-frequency segments, wherein a mapping of packet streams to segments is achieved using a one-dimensional offset with respect to an origin of the zone.

9. The method of claim 1, wherein a modulation and coding scheme index associated with each packet stream carries information about the utilized modulation and coding scheme for the packet stream.

10. The method of claim 1, wherein a starting time-frequency coordinate and an ending time-frequency coordinate are used to specify a location of a packet stream within the zone.

11. The method of claim 1, further comprising using adaptive modulation and coding for the transmission of the group of control messages.

12. The method of claim 11, wherein the modulation and coding for the group of control messages is the same as the modulation and coding used for the packet streams associated with the group of control messages.

13. The method of claim 11, wherein the modulation and coding for the group of control messages is one level lower than the modulation and coding used for the packet streams associated with the group of control messages.

14. The method of claim 1, wherein the common characteristic is the coding and modulation scheme of the packet streams and further comprising a header transmitted prior to the group of control messages to indicate a length of the group and a modulation and coding scheme used for the group.

15. The method of claim 1, wherein the zone is divided into a plurality of rows and a plurality of columns to thereby form a coordinate system.

16. The method of claim 15, wherein a location of a packet stream within the zone may be specified by an offset from an origin of the zone.

17. The method of claim 15, wherein a location of a packet stream within the zone may be specified by a starting row and column coordinate and an ending row and column coordinate.

18. The method of claim 15, wherein a granularity of a time coordinate is an OFDM symbol and a granularity of a frequency coordinate is a subcarrier.

19. The method of claim 1, wherein the portion of the time-frequency resource falling outside of the zone is treated as a second zone and wherein a resource allocation message pertaining to the second zone is communicated to a base station and a mobile station.

20. The method of claim 19, further comprising dividing the second zone into a plurality of units, wherein the resource allocation message identifies at least some of the packet streams in the second zone based on the plurality of units.

21. The method of claim 19, wherein the resource allocation message identifies a connection identifier, a resource identification parameter, and a modulation and coding index for at least some of the packet streams in the second zone.

22. A method of communication between base stations and mobile devices in a multi-carrier packet communication system that utilizes a time-frequency resource and covers a plurality of geographic cells, the method comprising:
   allocating a zone in the time-frequency resource, wherein the zone is designated for a type of application and is capable of carrying two or more packet streams associated with the type of application, and wherein the portion of the time-frequency resource falling outside of the zone is capable of carrying two or more packet streams not associated with the type of application;
   for at least some of the two or more packet streams within the zone, creating a control message associated with each packet stream wherein the control message is used in part to ensure proper communication of the packet stream;
   aggregating the created control messages associated with each packet stream in accordance with a common characteristic of the packet streams;
   transmitting the control messages in a group;
   assigning a basic connection identification (BCID) value to a packet stream communicated via the time-frequency resource;
   assigning an application connection identification (ACID) value to a second packet stream communicated via the time-frequency resource, wherein the ACID value contains a lesser number of bits than the BCID value and wherein the ACID value is augmented by time or frequency indices in the time-frequency resource to identify the second packet stream; and
   incorporating the ACID value in the control message associated with the identified second packet stream.

23. The method of claim 22, wherein an ACID value may be reused by base stations or mobile devices.

24. A method of communication between base stations and mobile devices in a multi-carrier packet communication system that utilizes an time-frequency resource and covers a plurality of geographic cells, the method comprising:
   allocating a zone in the time-frequency resource for voice-over-IP packet streams, wherein the zone is capable of carrying two or more packet streams, and the packet streams are arranged sequentially in the zone starting at an origin;
   specifying a location of a packet stream in the zone by an offset to the origin, wherein the offset is one or more units of time-frequency resource that is determined by a type of modulation and coding associated with the packet stream;
   for at least some of the voice-over-IP packet streams within the zone, creating a control message associated with each packet stream wherein the control message is used in part to ensure proper communication of the packet stream;
   aggregating the created control messages associated with each packet stream in accordance with a common characteristic of the packet streams; and
   transmitting the control messages in a group.

25. The method of claim 24, wherein the offset is not included in the control message associated with the packet stream and is instead calculated from the type of modulation and coding associated with other packet streams that precede the packet stream in the sequence of packet streams.

26. The method of claim 24, wherein the offset is included in the control message associated with the packet stream.

27. The method of claim 24, wherein an time-frequency resource associated with each of the two or more packet streams within the zone is allocated based on voice activity carried in the corresponding packet stream.

28. The method of claim 27, wherein the allocated time-frequency resource is an initial amount of resource and adaptive modulation and coding with an adaptive multi-rate voice coding is used to improve voice quality carried in the packet stream.

29. The method of claim 27, further comprising reallocating time-frequency resource associated with a first packet stream having a silent voice connection to a second packet stream having an active voice connection.

30. The method of claim 29, wherein the second packet stream is the last packet stream in the sequence of packet streams that has the same coding and modulation scheme as the first packet stream.

31. The method of claim 29, wherein the second packet stream is the next packet stream in sequence after the first packet stream.

32. The method of claim 29, wherein the second packet stream is the last packet stream in the sequence of packet streams.

* * * * *

UNITED STATES PATENT AND TRADEMARK OFFICE
CERTIFICATE OF CORRECTION

| | |
|---|---|
| PATENT NO. | : 7,948,944 B2 |
| APPLICATION NO. | : 11/908257 |
| DATED | : May 24, 2011 |
| INVENTOR(S) | : Xiaodong Li et al. |

Page 1 of 1

It is certified that error appears in the above-identified patent and that said Letters Patent is hereby corrected as shown below:

In column 3, line 9, delete "described. In" and insert -- described in --, therefor.

In column 6, line 23, delete "moauiar" and insert -- modular --, therefor.

In column 7, line 4, delete "packet packet" and insert -- packet --, therefor.

In column 7, line 19, delete "zone." and insert -- zone, --, therefor.

In column 9, line 43, delete "(1Es)," and insert -- (IEs), --, therefor.

In column 9, line 53, delete "fo" and insert -- of --, therefor.

In column 10, line 24, delete "the although" and insert -- although the --, therefor.

In column 14, line 33, in claim 24, delete "streams," and insert -- streams --, therefor.

In column 15, line 2, in claim 29, delete "time-frequency" and insert -- a time-frequency --, therefor.

In column 15, line 8, in claim 30, delete "stream." and insert -- stream, and further comprising reallocating the packet streams subsequent to the second packet stream in the sequence of packet streams in order to fill the airlink resource that was vacated by the second packet stream. --, therefor.

Signed and Sealed this
Twenty-first Day of February, 2012

David J. Kappos
*Director of the United States Patent and Trademark Office*